(12) United States Patent
Aramaki

(10) Patent No.: US 10,734,804 B2
(45) Date of Patent: Aug. 4, 2020

(54) POWER CONVERSION DEVICE AND DC POWER TRANSMISSION SYSTEM

(71) Applicant: Mitsubishi Electric Corporation, Chiyoda-ku, Tokyo (JP)

(72) Inventor: Takuo Aramaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 420 days.

(21) Appl. No.: 15/736,147

(22) PCT Filed: Jun. 23, 2015

(86) PCT No.: PCT/JP2015/068028
§ 371 (c)(1),
(2) Date: Dec. 13, 2017

(87) PCT Pub. No.: WO2016/207976
PCT Pub. Date: Dec. 29, 2016

(65) Prior Publication Data
US 2018/0159316 A1     Jun. 7, 2018

(51) Int. Cl.
*H02H 7/26* (2006.01)
*H02J 1/00* (2006.01)
(Continued)

(52) U.S. Cl.
CPC ............. *H02H 7/268* (2013.01); *H02H 3/08* (2013.01); *H02H 7/12* (2013.01); *H02H 7/1216* (2013.01);
(Continued)

(58) Field of Classification Search
CPC ........ H02H 7/268; H02H 7/1216; H02H 3/08; H02H 7/12; H02M 7/483; H02M 7/217; H02M 1/32; H02M 1/08; H02M 2007/4835; H02M 2001/325; H02J 1/00; Y02E 60/60
USPC ............................................. 361/54
See application file for complete search history.

(56) References Cited

U.S. PATENT DOCUMENTS

2017/0085193 A1 * 3/2017 Akagi ............... H02M 1/42
2017/0163170 A1   6/2017 Tahata et al.
2017/0288569 A1 * 10/2017 Uda ................. H02M 7/23

FOREIGN PATENT DOCUMENTS

JP          57-31332 A     2/1982
JP          57-46631 A     3/1982
(Continued)

OTHER PUBLICATIONS

Extended European Search Report dated Jan. 28, 2019, issued by the European Patent Office in corresponding European Application No. 15896298.5. (7 pages).

(Continued)

*Primary Examiner* — Dharti H Patel
(74) *Attorney, Agent, or Firm* — Buchanan Ingersoll & Rooney PC

(57) ABSTRACT

A power conversion device used in a DC power transmission system having a multipolar configuration includes: a self-excited AC/DC converter configured to convert electric power between an AC system and a main line; and a controller. The controller is configured to: receive an input of a current value between a neutral point and a DC terminal of the AC/DC converter; control an operation of the AC/DC converter; and control a switch to be opened and closed, the switch being provided between the DC terminal and the neutral point. When the current value is equal to or greater than a predetermined threshold value, the controller stops a plurality of cells and subsequently closes a bypass switch. When the current value is equal to or greater than a predetermined threshold value, the controller opens the switch.

9 Claims, 13 Drawing Sheets

(51) Int. Cl.
  *H02H 7/12* (2006.01)
  *H02M 7/483* (2007.01)
  *H02H 3/08* (2006.01)
  *H02M 1/08* (2006.01)
  *H02M 1/32* (2007.01)
  *H02M 7/217* (2006.01)

(52) U.S. Cl.
  CPC .............. *H02J 1/00* (2013.01); *H02M 1/08* (2013.01); *H02M 1/32* (2013.01); *H02M 7/217* (2013.01); *H02M 7/483* (2013.01); *H02M 2001/325* (2013.01); *H02M 2007/4835* (2013.01); *Y02E 60/60* (2013.01)

(56) References Cited

FOREIGN PATENT DOCUMENTS

| | | |
|---|---|---|
| JP | 59-127576 A | 7/1984 |
| JP | 60-32524 A | 2/1985 |
| JP | 5-41345 U | 6/1993 |
| JP | 2005-94874 A | 4/2005 |
| JP | 5622978 B1 | 11/2014 |
| JP | 5730458 B1 | 6/2015 |

OTHER PUBLICATIONS

International Search Report (PCT/ISA/210) dated Sep. 15, 2015, by the Japanese Patent Office as the International Searching Authority for International Application No. PCT/JP2015/068028.

Notice of Grounds of Rejection for Japanese Patent Application No. 2015-562997, dated Feb. 23, 2016, with English language translation.

Notice of Grounds of Rejection for Japanese Patent Application No. 2016-151859, dated Feb. 14, 2017, with English language translation.

* cited by examiner

POWER CONVERSION DEVICE AND DC POWER TRANSMISSION SYSTEM

TECHNICAL FIELD

The present disclosure relates to a power conversion device and a direct-current (DC) power transmission system, and particularly to a self-excited power conversion device used in a DC power transmission system having a multipolar configuration, and the DC power transmission system.

BACKGROUND ART

In recent years, as the electric power demand has been increased, there are increasing expectations for high-voltage DC power transmission as means for implementing large-capacity/long-distance power transmission, power interchange between different frequency systems, and the like. High-voltage DC power transmission can reduce power transmission loss and also reduce the equipment cost for power transmission lines. Thus, for long-distance power transmission, high-voltage DC power transmission is more advantageous in cost aspect than alternating-current (AC) power transmission. Accordingly, high-voltage DC power transmission has been rapidly spreading domestically and abroad.

For such high-voltage DC power transmission, there is a power converter employed for converting electric power in an AC system into DC power, or for converting DC power flowing through a DC line into AC power. Although a separately-excited converter to which a thyristor is applied has been conventionally used as a power converter, it is recently considered to apply a self-excited voltage type converter.

For example, Japanese Patent Laying-Open No. 2005-094874 (PTD 1) discloses a method of operating a DC power transmission facility. According to this operating method, when a failure occurs in one of a plurality of self-excited AC/DC converters connected in series or parallel, (i) when the failed self-excited AC/DC converter is connected in series, the failed self-excited AC/DC converter is bypassed, and (ii) when the failed self-excited AC/DC converter is connected in parallel, the failed self-excited AC/DC converter is separated from the DC system. Thus, the operation is continued using a sound self-excited AC/DC converter.

CITATION LIST

Patent Document

PTD 1: Japanese Patent Laying-Open No. 2005-094874

SUMMARY OF INVENTION

Technical Problem

Among self-excited voltage type converters, particularly a multilevel converter can achieve both of production of high voltages and conversion of the output voltage into a sinusoidal wave. Thus, such a multilevel converter has been put into practical use. Among them, a modular multilevel converter (MMC) is attracting high attention. The MMC is configured such that a chopper circuit is multistage-connected to each arm to implement a high withstand voltage, so as to output an AC voltage.

Such an MMC is applied, for example, to a DC power transmission system having a bipolar configuration that is known as a configuration of a commonly-used DC power transmission system. In a bipolar DC power transmission system, when a fault occurs in a DC power transmission line (main line), the main line, the rectifier and the inverter on the side where the fault occurs are stopped, but the main line, the rectifier and the inverter on the side where no fault occurs are required to be continuously utilized. Also, particularly in the case where a fault on the DC power transmission line is a fault on an aerial line, the main line, the rectifier and the inverter on the side where a fault occurs are also required to be restarted immediately after the fault is cleared.

As described above, according to the technique disclosed in PTD 1, the failed self-excited AC/DC converter is separated from the DC system so as to continue the operation using a sound self-excited AC/DC converter. However, this technique is countermeasures against only the fault in the self-excited AC/DC converter itself, but is not supposed to address the fault on the DC power transmission line. Thus, there occurs a problem that the above-described requests cannot be satisfied.

The present disclosure has been made in light of the above-described problems. An object in a certain aspect is to provide: a self-excited power conversion device capable of more speedily detecting and clearing a fault in a DC power transmission system having a multipolar configuration; the DC power transmission system.

Solution to Problem

According to an embodiment, a power conversion device used in a DC power transmission system having a multipolar configuration and including at least two main lines is provided. The power conversion device includes an AC/DC converter configured to convert electric power between an AC system and a main line of the at least two main lines, and a controller. The AC/DC converter includes at least one phase module. The phase module includes an AC terminal, a DC terminal on a side of the main line, a DC terminal on a side of a neutral point, a first arm provided between the DC terminal on the side of the main line and the AC terminal, and a second arm provided between the DC terminal on the side of the neutral point and the AC terminal. Each of the first arm and the second arm has a plurality of cells that are connected in series. Each of the plurality of cells includes a switching element, a diode and a capacitor, the diode and the capacitor being connected in parallel with the switching element. At least one bypass switch for short-circuiting the plurality of cells is connected to the plurality of cells. The controller includes: a current input unit configured to receive an input of a current value between the neutral point and the DC terminal on the side of the neutral point or a current value between the main line and the DC terminal on the side of the main line; a converter control unit configured to control an operation of the AC/DC converter, and a switch control unit configured to be capable of controlling a first switch to be opened and closed, the first switch being provided between the neutral point and the DC terminal on the side of the neutral point. When the current value is equal to or greater than a predetermined threshold value, the converter control unit stops the plurality of cells and subsequently closes the bypass switch. When the current value is equal to or greater than a predetermined threshold value, the switch control unit opens the first switch.

Advantageous Effects of Invention

According to the present disclosure, it becomes possible to more speedily detect and clear a fault in a DC power transmission system having a multipolar configuration.

DESCRIPTION OF EMBODIMENTS

Figure 1:
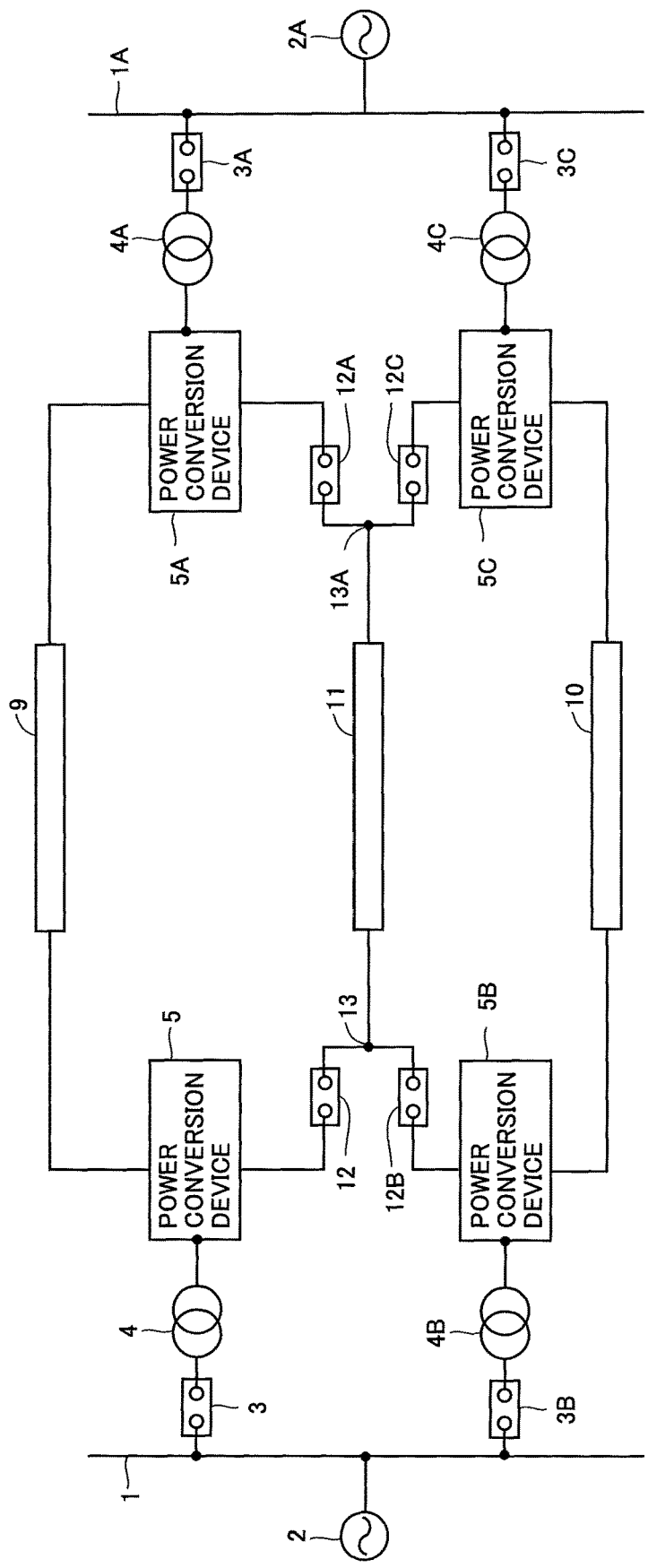
FIG. 1 is a diagram showing an example of the entire configuration of a DC power transmission system.

The embodiments of the present invention will be hereinafter described with reference to the accompanying drawings. In the following description, the same components are designated by the same reference characters. Names and functions thereof are also the same. Accordingly, the detailed description thereof will not be repeated.

<Entire Configuration>

FIG. 1 is a diagram showing an example of the entire configuration of a DC power transmission system. Referring to FIG. 1, the DC power transmission system is configured as a DC power transmission system having a bipolar configuration (a bipolar DC power transmission system), which is formed of DC power transmission lines (main lines) 9 and 10 of two poles, and a neutral line 11. The bipolar DC power transmission system is formed by connecting neutral points 13 and 13A through one neutral line 11. Each of neutral points 13 and 13A is located between two DC power transmission systems divided into two positive and negative poles. Electric power is transmitted and received between two AC systems 2 and 2A through main lines 9 and 10.

In the following description, for convenience of explanation, the pole formed of power conversion devices 5 and 5A, main line 9 on the positive side and neutral line 11 is defined as the first pole, and the pole formed of power conversion devices 5B and 5C, main line 10 on the negative side and neutral line 11 is defined as the second pole. The first pole and the second pole share neutral line 11.

An AC bus 1 is connected to power conversion device 5 through an AC breaker 3 and a transformer 4, and also connected to power conversion device 5B through an AC breaker 3B and a transformer 4B. An AC bus 1A is connected to power conversion device 5A through an AC breaker 3A and a transformer 4A, and also connected to power conversion device 5C through an AC breaker 3C and a transformer 4C. Power conversion devices 5, 5A, 5B, and 5C are connected to neutral line 11 through breakers 12, 12A, 12B, and 12C, respectively. Power conversion devices 5 and 5A are connected to main line 9, and power conversion devices 5B and 5C are connected to main line 10.

In the present embodiment, power conversion devices 5 and 5B each functioning as a rectifier are connected in series. Power conversion devices 5A and 5C each functioning as an inverter are connected in series. In this case, the AC power is converted into DC power by power conversion devices 5 and 5B. Then, this converted DC power is DC-transmitted through main lines 9 and 10. Then, at the receiving ends, power conversion devices 5A and 5C convert the DC power into AC power, and supply the converted AC power through transformers 4A and 4C to AC bus 1A. When power conversion devices 5 and 5A each function as an inverter, and power conversion devices 5B and 5C each function as a rectifier, the operation of conversion opposite to the above is performed. Neutral line 11 is provided so as to allow flowing of an unbalance direct current between dipoles and a direct current during operation on one-side pole.

<Configuration of Power Conversion Device>

Figure 2:
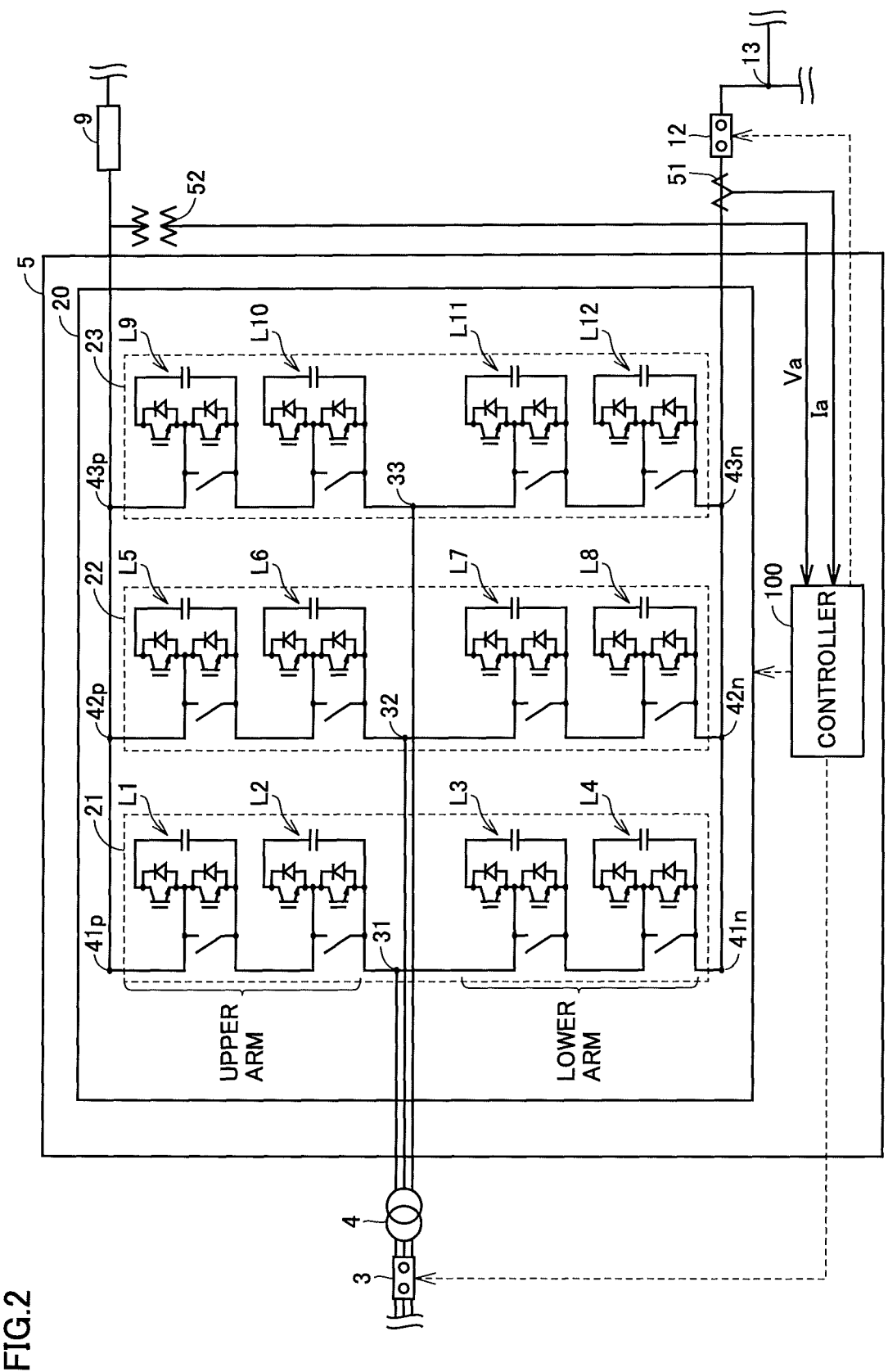
FIG. 2 is a diagram for illustrating the configuration of a power conversion device.

FIG. 2 is a diagram for illustrating the configuration of a power conversion device. In the following, the configuration of power conversion device 5 will be described for convenience of explanation. In addition, the configuration of each of power conversion devices 5A to 5C is the same as that of power conversion device 5.

Power conversion device 5 includes a controller 100 and an AC/DC converter 20. AC/DC converter 20 is configured of a self-excited voltage type power converter capable of independently controlling active power and reactive power. Specifically, AC/DC converter 20 includes three phase modules 21, 22 and 23 that are connected in parallel with one another.

Phase module 21 includes an AC terminal 31, a DC terminal 41$p$ on the positive side (on the main line 9 side), a DC terminal 41$n$ on the negative side (on the neutral line 11 side), an upper arm (a cell L1 and a cell L2), and a lower arm (a cell L3 and a cell L4). Phase module 22 includes an AC terminal 32, a DC terminal 42$p$ on the positive side, a DC terminal 42$n$ on the negative side, an upper arm (a cell L5 and a cell L6), and a lower arm (a cell L7 and a cell L8). Phase module 23 includes an AC terminal 33, a DC terminal 43$p$ on the positive side, a DC terminal 43$n$ on the negative side, an upper arm (a cell L9 and a cell L10), and a lower arm (a cell L11 and a cell L12). The present embodiment will be described with regard to a circuit in which each arm is formed of two cells L, but each arm may be formed of one cell L or may be formed of three or more cells L.

AC terminals 31 to 33 are connected to AC system 2 through transformer 4, AC breaker 3 and AC bus 1. DC terminals 41$p$ to 43$p$ are connected to main line 9. DC terminals 41$n$ to 43$n$ are connected to neutral line 11 through breaker 12. In other words, AC breaker 3 is provided between AC system 2 and AC terminals 31 to 33, in which AC terminals 31 to 33 are connected to AC breaker 3 through transformer 4. Breaker 12 is provided between neutral point 13 and DC terminals 41*n* to 43*n* on the side of neutral point 13 (neutral line 11).

Figure 3:
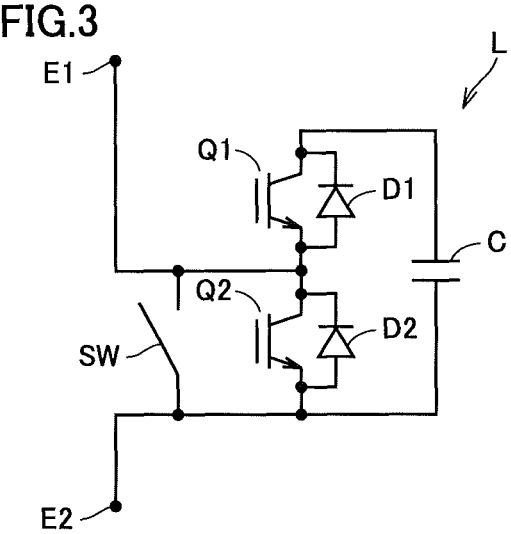
FIG. 3 is a diagram showing the circuit configuration of a cell.

FIG. 3 is a diagram showing the circuit configuration of cell L. The configuration of each of cells L1 to L12 is the same as that of cell L shown in FIG. 3. Referring to FIG. 3, cell L includes two switching elements Q1 and Q2, two diodes D1 and D2, and a capacitor C. Two switching elements Q1 and Q2 are switched based on the gate signal transmitted from controller 100, thereby cell L operates (drives). Switching elements Q1 and Q2 each are a power semiconductor element such as an insulated gate bipolar transistor (IGBT), for example.

Two switching elements Q1 and Q2 are connected in series. Diodes D1 and D2 are reflux diodes connected in anti-parallel with switching elements Q1 and Q2, respectively. Capacitor C as an energy storage element is connected in parallel with switching elements Q1 and Q2 that are connected in series. Typically, a cell terminal E1 extending from one end of switching element Q2 is connected to a cell terminal E1 of a cell L adjacent thereto on the positive side. A cell terminal E2 extending from the other end of switching element Q2 is connected to a cell terminal E1 of a cell L adjacent thereto on the negative side. A bypass switch SW is connected to both ends of switching element Q2.

Bypass switch SW is connected between cell terminals E1 and E2. Bypass switch SW serves as a switch configured to close a contact such that (each end of) switching element Q2 can be short-circuited. Thus, bypass switch SW allows passage of a fault current. In other words, bypass switch SW serves to short-circuit cell L to thereby protect each element included in cell L (switching elements Q1, Q2, diodes D1, D2, and capacitor C) from an overcurrent generated upon occurrence of a fault.

Again referring to FIG. 2, a current detector 51 is provided between DC terminals 41*n* to 43*n* and breaker 12. Current detector 51 detects a current flowing through each of DC terminals 41*n* to 43*n*, and inputs a current value Ia of the current into controller 100. Examples of current detector 51 may be: a direct current transformer (DCCT); a hole current detector (HCT); and the like, each of which is capable of detecting a current value together with a DC component.

DC voltage detector 52 is provided between DC terminals 41*p* to 43*p* and main line 9. DC voltage detector 52 detects a DC voltage applied to main line 9 and inputs its DC voltage value Va into controller 100.

Controller 100 performs various processes based on the inputted current and voltage values. Specifically, controller 100 is configured to: make a determination about a fault on main line 9; control the operation of AC/DC converter 20 to be stopped and resumed; control AC breaker 3 to be opened and closed; control breaker 12 to be opened and closed; and the like. Specific details of the process of controller 100 will be described later.

Typically, controller 100 is configured of a microcomputer as a main body, and includes a central processing unit (CPU) that is not shown. Controller 100 is implemented by the CPU executing the data and the program that are stored in a memory such as a read only memory (ROM) and a random access memory (RAM) that are not shown. In addition, controller 100 may be configured of hardware such as a circuit for implementing the process based on the instruction executed by the CPU.

<Outline of System Operation>

Then, referring to FIGS. 4 to 7, the outline of the operation of a bipolar DC power transmission system having the configuration as described above will be hereinafter described.

Figure 4:
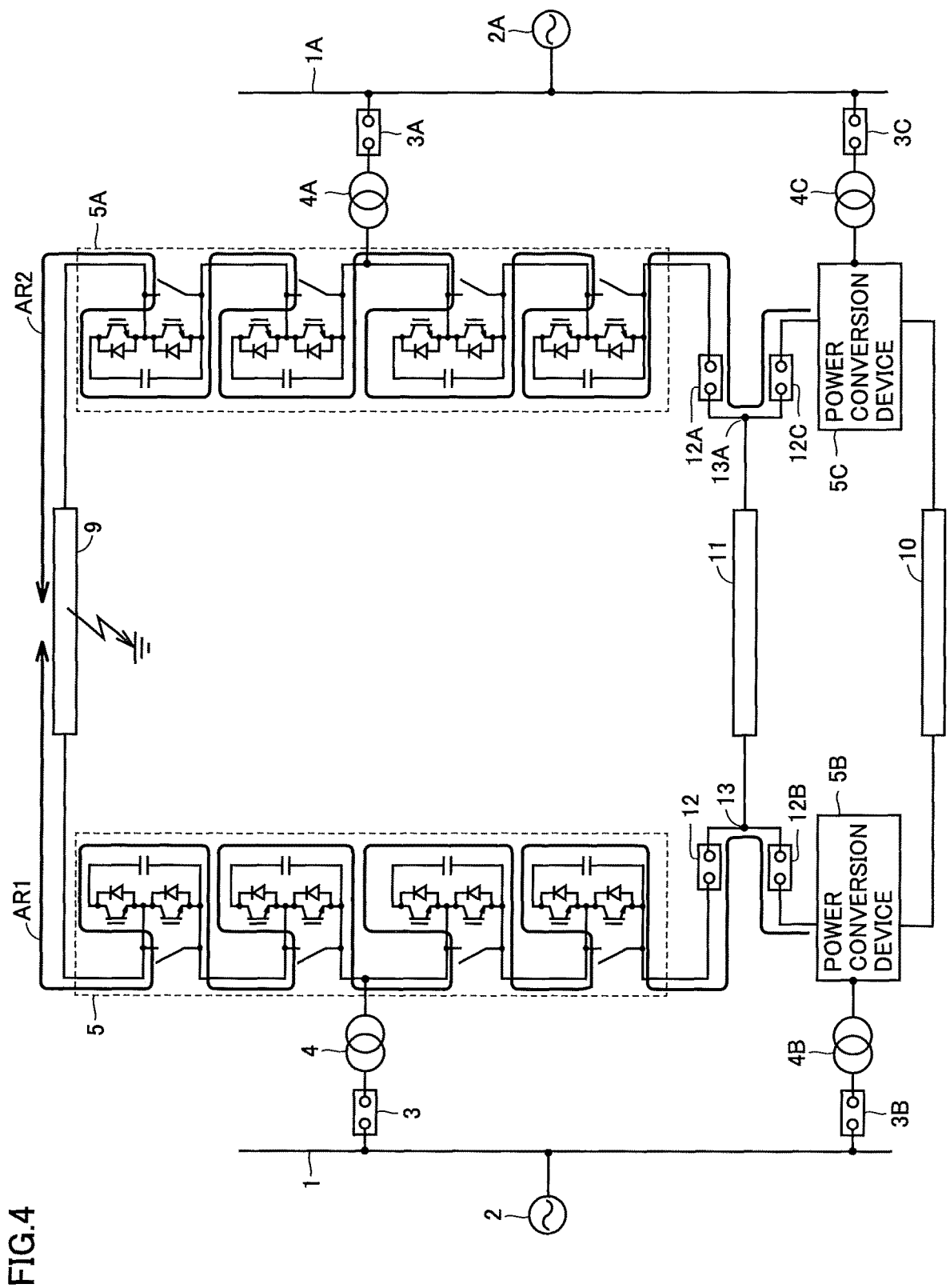
FIG. 4 is a diagram showing the flow of a fault current in the first aspect immediately after a fault occurs on a main line.
Figure 5:
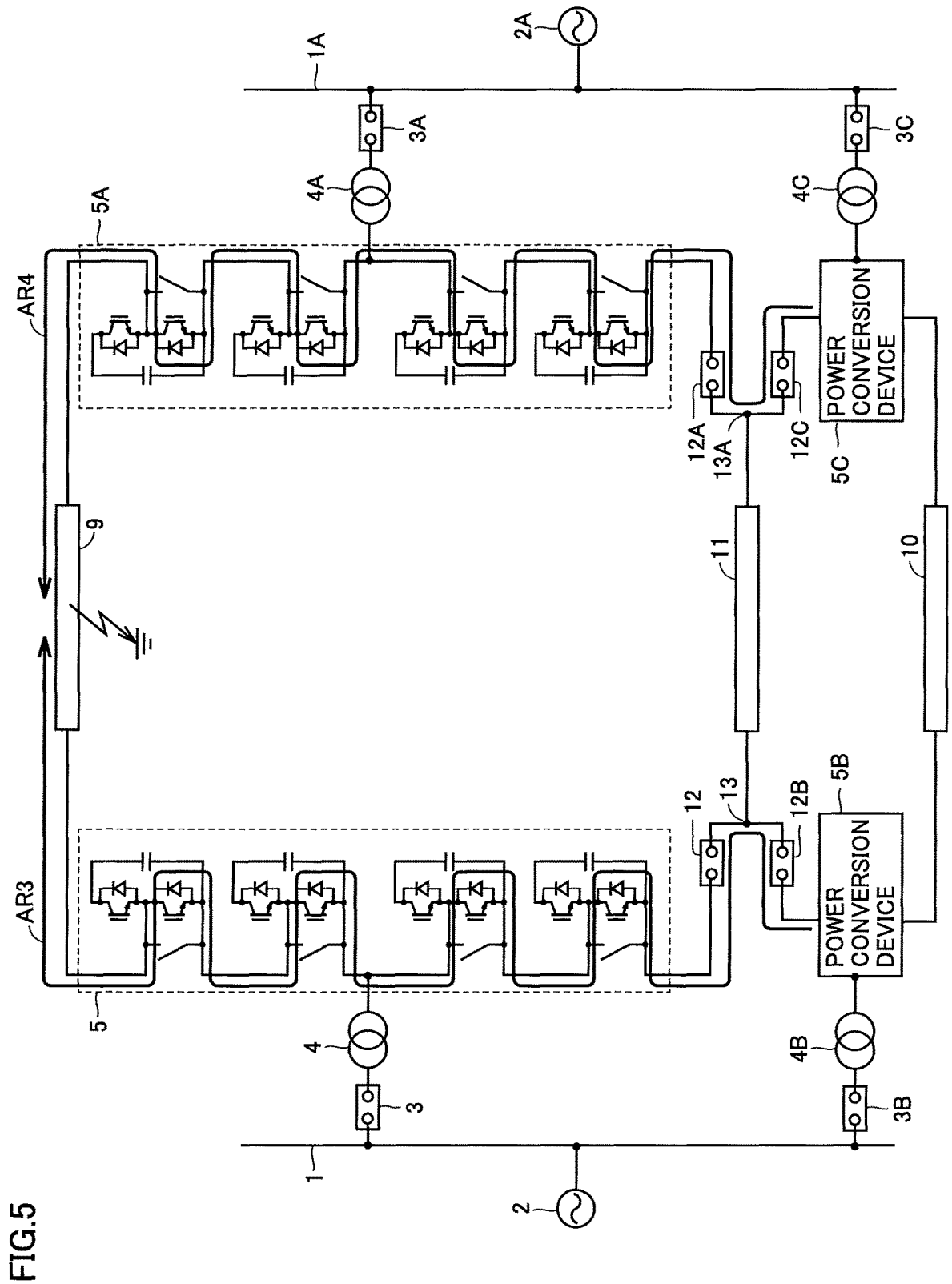
FIG. 5 is a diagram showing the flow of a fault current in the second aspect after the first aspect shown in FIG. 4.
Figure 6:
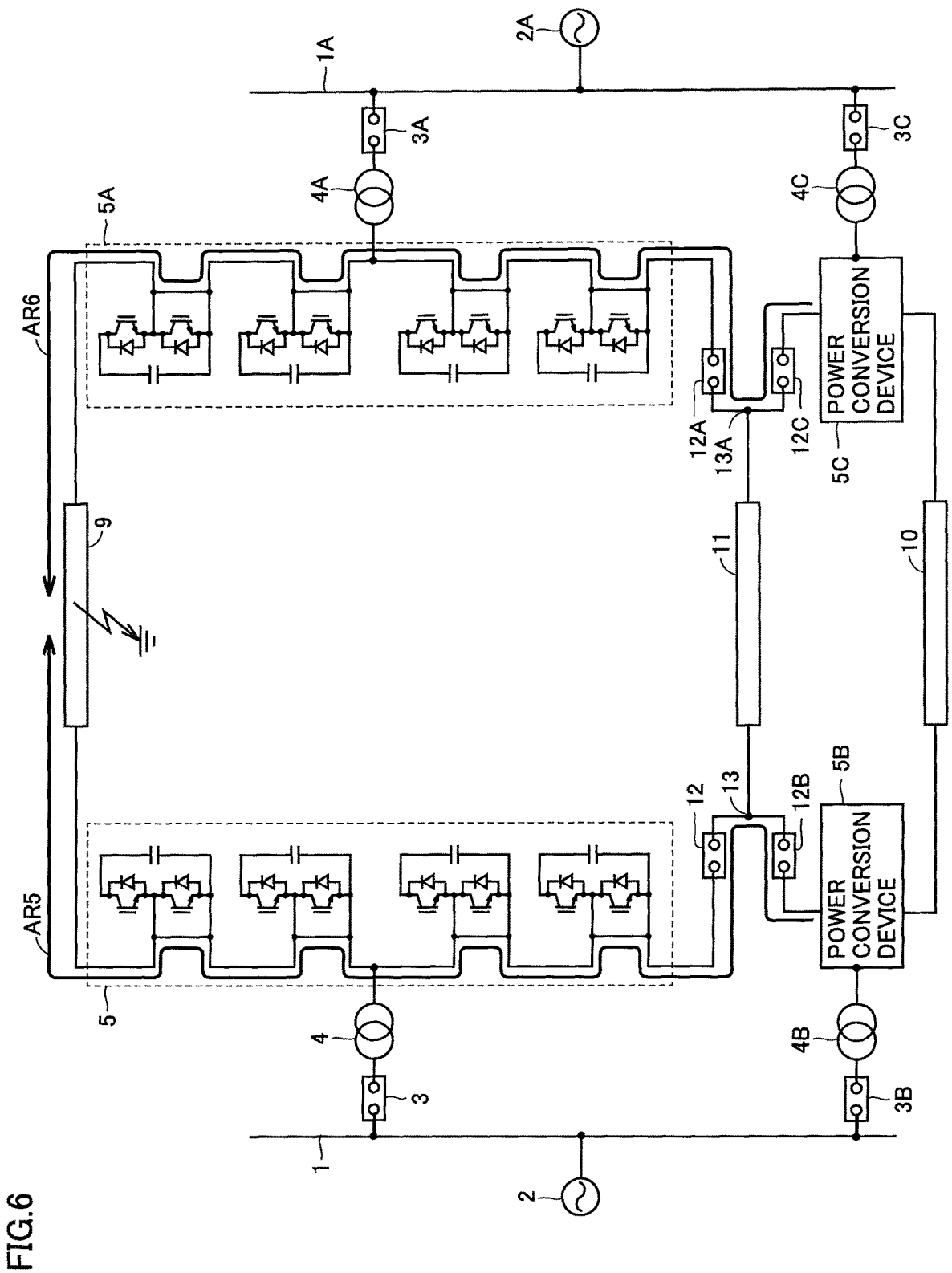
FIG. 6 is a diagram showing the flow of a fault current in the third aspect after the second aspect shown in FIG. 5.
Figure 7:
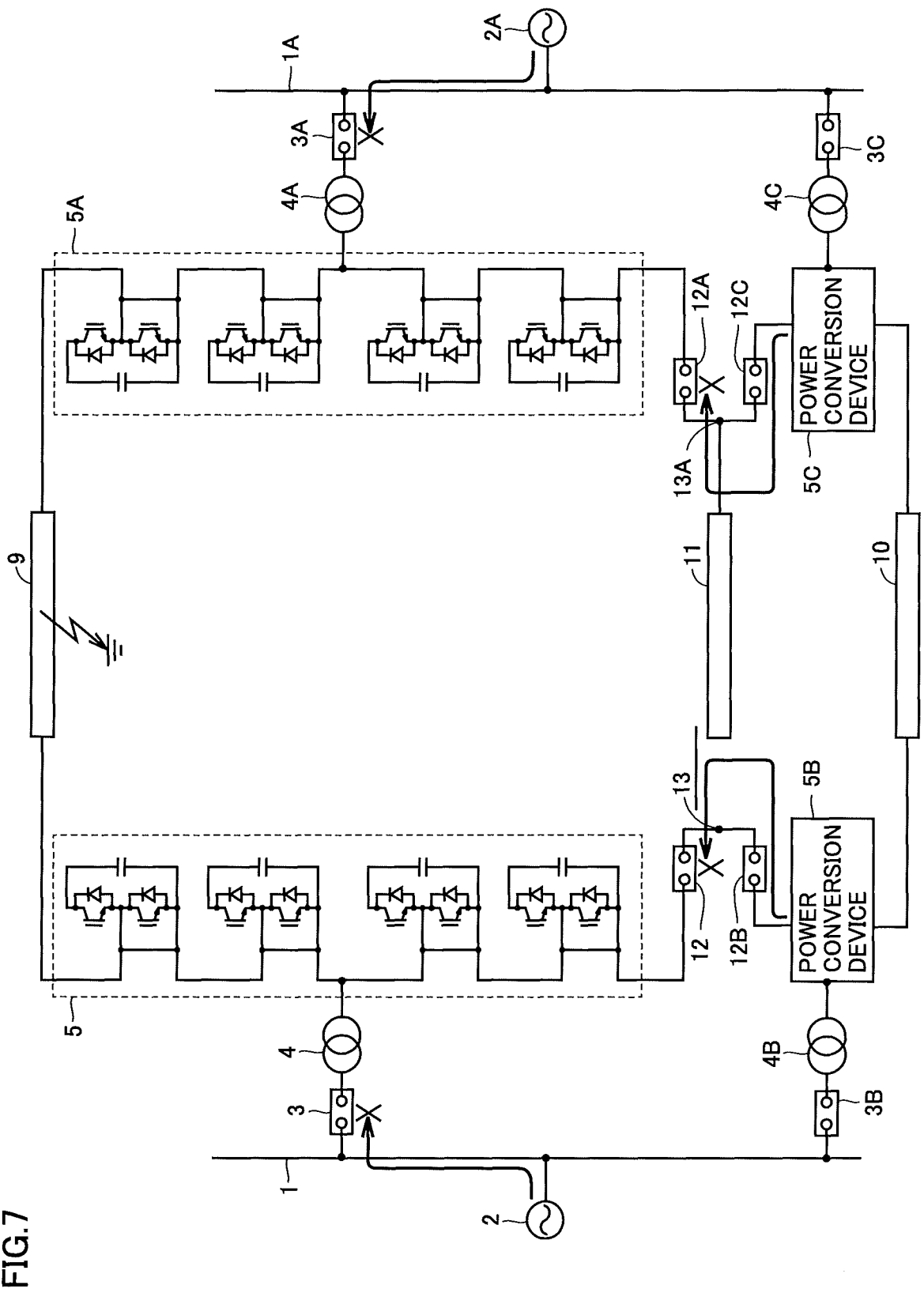
FIG. 7 is a diagram showing the flow of a fault current in the fourth aspect after the third aspect shown in FIG. 6.

FIG. 4 is a diagram showing the flow of a fault current in the first aspect immediately after a fault occurs on main line 9. FIG. 5 is a diagram showing the flow of a fault current in the second aspect after the first aspect shown in FIG. 4. FIG. 6 is a diagram showing the flow of a fault current in the third aspect after the second aspect shown in FIG. 5. FIG. 7 is a diagram showing the flow of a fault current in the fourth aspect after the third aspect shown in FIG. 6.

For the convenience of description, each of FIGS. 4 to 7 shows only one phase module included in an AC/DC converter in each of power conversion devices 5 and 5A to explain the flow of a fault current. It is to be noted that a fault current flows in the same manner in each phase module.

Referring to FIG. 4, when a ground fault occurs on main line 9 in the first pole, the fault current flows in the direction from power conversion devices 5 and 5B toward the fault point (main line 9) as shown by an arrow AR1. Also, the fault current flows in the direction from power conversion devices 5A and 5C toward the fault point as shown by an arrow AR2. Power conversion devices 5 and 5B each detect a fault current, and perform the following process.

Immediately after occurrence of a fault, the AC/DC converter in each of power conversion devices 5 and 5A is being operating (each switching element is undergoing a switching operation). Accordingly, as shown in FIG. 4, for example, in each cell L, a fault current flows through capacitor C and the switching element in the conductive state (switching element Q1 in an example of FIG. 4).

Then, in order to prevent each element (switching elements Q1, Q2, diodes D1, D2, and capacitor C) in cell L from being destroyed by a fault current, (the operation of) each cell L is stopped by power conversion devices 5 and 5A in the first pole where a fault occurs. In this case, stopping cell L means that switching elements Q1 and Q2 are turned off (so as not to be turned on), thereby preventing a voltage from being outputted from cell L. However, even if each cell L is stopped, a fault current continuously flows through diode D2 in the direction toward a fault point, as shown by arrows AR3 and AR4 in FIG. 5.

Then, in order to prevent breakage of diode D2, power conversion devices 5 and 5A close bypass switch SW connected to each cell L. Thus, as shown by arrows AR5 and AR6 in FIG. 6, the fault current is caused to flow through bypass switch SW connected to cell L in the direction toward a fault point. Thereby, since each cell L is short-circuited, breakage of switching elements Q1, Q2, diodes D1, D2, and capacitor C can be prevented.

Then, referring to FIG. 7, power conversion devices 5 and 5A open AC breakers 3 and 3A, respectively. Thereby, the AC currents flowing from AC systems 2 and 2A into power conversion devices 5 and 5A, respectively, are broken. After AC breakers 3 and 3A are opened, power conversion devices 5 and 5A open breakers 12 and 12A, respectively. Thereby, the current flowing from the sound second pole into the first pole is broken. In other words, the first pole and the second pole are completely separated from each other, so that the operation can be continued in the second pole in which no fault occurs.

As described above, when a fault occurs, the process is carried out in the order of: gate-blocking the AC/DC converter (turning off the switching element); closing bypass switch SW; opening AC breaker 3; and opening breaker 12. This is for preventing an adverse influence from being exerted upon the DC power transmission system by opening AC breaker 3 and breaker 12 during the operation of the AC/DC converter, and also for more speedily clearing the influence upon its own device caused by a fault current.

Specifically, a time period T1 from the time when bypass switch SW is instructed to be closed until the time when bypass switch SW is closed is shorter than a time period T2 from the time when breaker 12 (or AC breaker 3) is instructed to be opened until the time when breaker 12 (or AC breaker 3) is opened. It is needless to say that a time period T3 from the time when a gate block command is output until the time when the switching element is turned off is overwhelmingly shorter than time period T1 and time period T2.

Accordingly, it turns out that the time period during which a fault current flows through each element in cell L can be minimized by performing the process in the order of: turning off the switching element; closing bypass switch SW; opening AC breaker 3, and opening breaker 12.

As shown in FIG. 7, in the first pole, AC breakers 3, 3A and breakers 12, 12A are opened, so that a current does not completely flow through power conversion devices 5 and 5A. Thus, when a predetermined time period has elapsed since breakers 12 and 12A were opened, power conversion devices 5 and 5A attempt to recover from a fault.

Specifically, power conversion devices 5 and 5A open bypass switch SW that are closed for protecting each element in cell L. Thereby, the AC/DC converter in each of power conversion devices 5 and 5A is brought into a restartable state (that is, in the state where a voltage can be output from cell L by an appropriate switching operation). Then, power conversion devices 5 and 5A close breakers 12 and 12A, respectively, and subsequently close AC breakers 3 and 3A, respectively. Then, power conversion devices 5 and 5A each resume the operation of each cell L. More specifically, each of power conversion devices 5 and 5A brings the AC/DC converter from the gate-blocked state (the state where switching elements Q1 and Q2 in each cell L are turned off) into the de-blocked state (the state where switching elements Q1 and Q2 in each cell L can be turned on), so as to output a voltage from each cell L.

According to the bipolar DC power transmission system as described above, a DC fault can be immediately cleared by preventing an inflow of a fault current from the pole in which no fault occurs (a sound pole) into the pole in which a fault occurs (a fault pole). Furthermore, the influence of the fault current upon the AC/DC converter can be minimized.

Furthermore, since the fault pole is separated from the sound pole, DC power transmission can be done only in the sound pole. Furthermore, by preventing an inflow of a fault current from a sound pole into a fault pole, bypass switch SW serving as a protection circuit inside the AC/DC converter in the fault pole can be opened. Accordingly, the AC/DC converter in the fault pole can also be immediately restarted.

In the above description, an explanation has been given with regard to the case where a fault current flows due to a fault on main line 9. However, also when the fault current as described above flows due to a fault in the AC/DC converter, damage to the AC/DC converter can be minimized by the above-described operation. Also in this case, DC power transmission can be done only in a sound pole while the AC/DC converter in a fault pole can also be immediately restarted.

<Functional Configuration of Controller 100>

Then, the functional configuration of controller 100 in power conversion device 5 will be hereinafter described. The functional configuration of the controller in each of other power conversion devices 5A to 5C is the same as that of controller 100.

Figure 8:
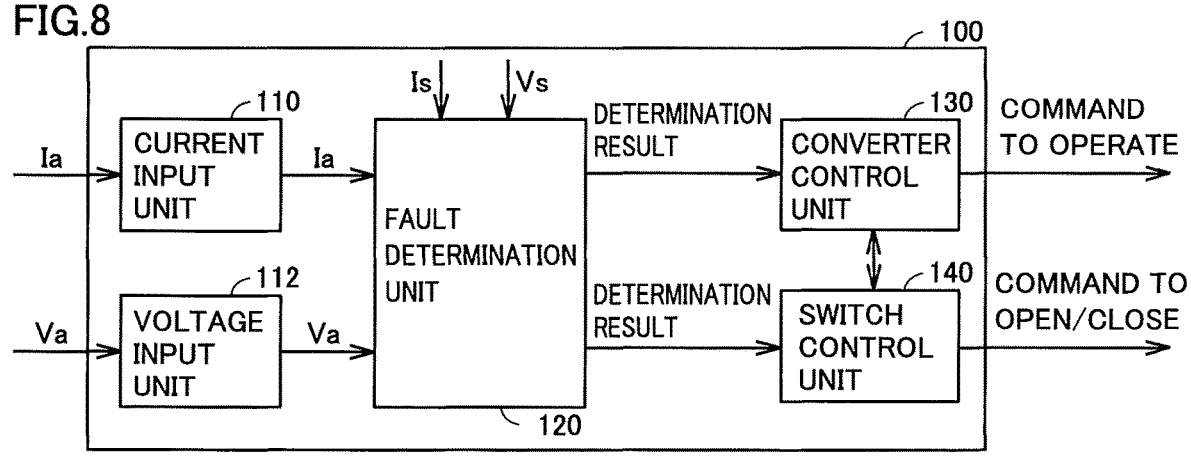
FIG. 8 is a functional block diagram of a controller in a power conversion device.

FIG. 8 is a functional block diagram of controller 100 in power conversion device 5. Referring to FIG. 8, controller 100 includes a current input unit 110, a voltage input unit 112, a fault determination unit 120, a converter control unit 130, and a switch control unit 140. Each of these functions is implemented by a CPU in controller 100 executing the program stored in a ROM. In addition, some or all of these functions may be configured so as to be implemented by hardware.

Current input unit 110 receives an input of a current value Ia of the direct current that flows between the neutral point and DC terminals 41n to 43n on the neutral point 13 (neutral line 11) side. Specifically, current input unit 110 receives an input of current value Ia from current detector 51.

Voltage input unit 112 receives an input of a voltage value Va on main line 9. Specifically, voltage input unit 112 receives an input of a DC voltage value Va from DC voltage detector 52.

Based on current value Ia (including a distinction between positive and negative) received by current input unit 110, and also based on a predetermined reference current threshold value Is, fault determination unit 120 determines whether a fault has occurred or not on main line 9. Specifically, when current value Ia is equal to or greater than reference current threshold value Is, fault determination unit 120 determines that a fault has occurred on main line 9. Typically, when a fault occurs on main line 9, a current flows from power conversion device 5 toward main line 9. Accordingly, when this current direction is defined as a positive direction, fault determination unit 120 can determine that a fault has occurred on main line 9 when current value Ia is equal to or greater than reference current threshold value Is (>0).

Furthermore, in order to more accurately determine occurrence of a fault on main line 9, DC voltage value Va (including a distinction between positive and negative) on main line 9 may be used. Specifically, fault determination unit 120 may be configured to determine that a fault has occurred on main line 9 when current value Ia is equal to or greater than reference current threshold value Is, and when DC voltage value Va is equal to or less than reference voltage threshold value Vs (approximately equal to 0V). This configuration utilizes the feature that DC voltage value Va on main line 9 becomes approximately 0V at the time when a fault occurs. In addition, in the normal state where no fault occurs, DC voltage value Va on main line 9 becomes a DC voltage on the positive side, the DC voltage value on main line 10 becomes a DC voltage on the negative side, and neutral line 11 reaches approximately 0V. Furthermore, reference current threshold value Is and reference voltage threshold value Vs are stored in advance in the memory (a ROM or a RAM) of controller 100.

Converter control unit 130 controls the operation of AC/DC converter 20. Specifically, converter control unit 130 transmits a gate signal to each of cells L1 to L12, to switch two switching elements Q1 and Q2 (to be turned on and off at a predetermined timing), thereby driving each of cells L1 to L12. Converter control unit 130 may be configured to transmit a gate signal to each of cells L1 to L12 in separate transmission lines, or may be configured to transmit a gate signal through a common transmission line to each of cells L1 to L12.

When current value Ia is equal to or greater than reference current threshold value Is (that is, when it is determined by fault determination unit 120 that a fault has occurred), in order to clear the fault, converter control unit 130 stops each of cells L1 to L12, and subsequently closes bypass switch SW (each bypass switch SW) connected to each of cells L1 to L12. Specifically, converter control unit 130 transmits a gate block command to each of cells L1 to L12 to turn off switching elements Q1 and Q2 in each of cells L1 to L12. Then, converter control unit 130 transmits a closing command to each bypass switch SW.

Switch control unit 140 controls breaker 12 to be opened and closed, and controls AC breaker 3 to be opened and closed. When it is determined by fault determination unit 120 that a fault has occurred, switch control unit 140 opens breaker 12 for clearing a fault (transmits a trip command to breaker 12). Specifically, after each bypass switch SW is closed, switch control unit 140 opens AC breaker 3, and subsequently opens breaker 12.

For recovering from a fault, converter control unit 130 opens each bypass switch SW after a predetermined time period has elapsed since breaker 12 was opened (since a trip command was transmitted to breaker 12). In addition, after it is confirmed that no current flows through AC/DC converter 20, converter control unit 130 may open each bypass switch SW. Specifically, converter control unit 130 may be configured to open each bypass switch SW when current value Ia is equal to or less than reference current threshold value Ik (that is, approximately equal to 0 A) after a predetermined time period has elapsed since breaker 12 was opened.

After each bypass switch SW is opened, switch control unit 140 closes breaker 12 (transmits a closing command to breaker 12), and subsequently closes AC breaker 3. After breaker 12 (and AC breaker 3) is closed, converter control unit 130 causes each of cells L1 to L12 to operate. Specifically, converter control unit 130 generates a gate signal for causing each of cells L1 to L12 to output the same voltage value and the same frequency as those obtained before occurrence of a fault. Then, converter control unit 130 transmits the gate signal to each of cells L1 to L12.

<Processing Procedure>

Figure 9:
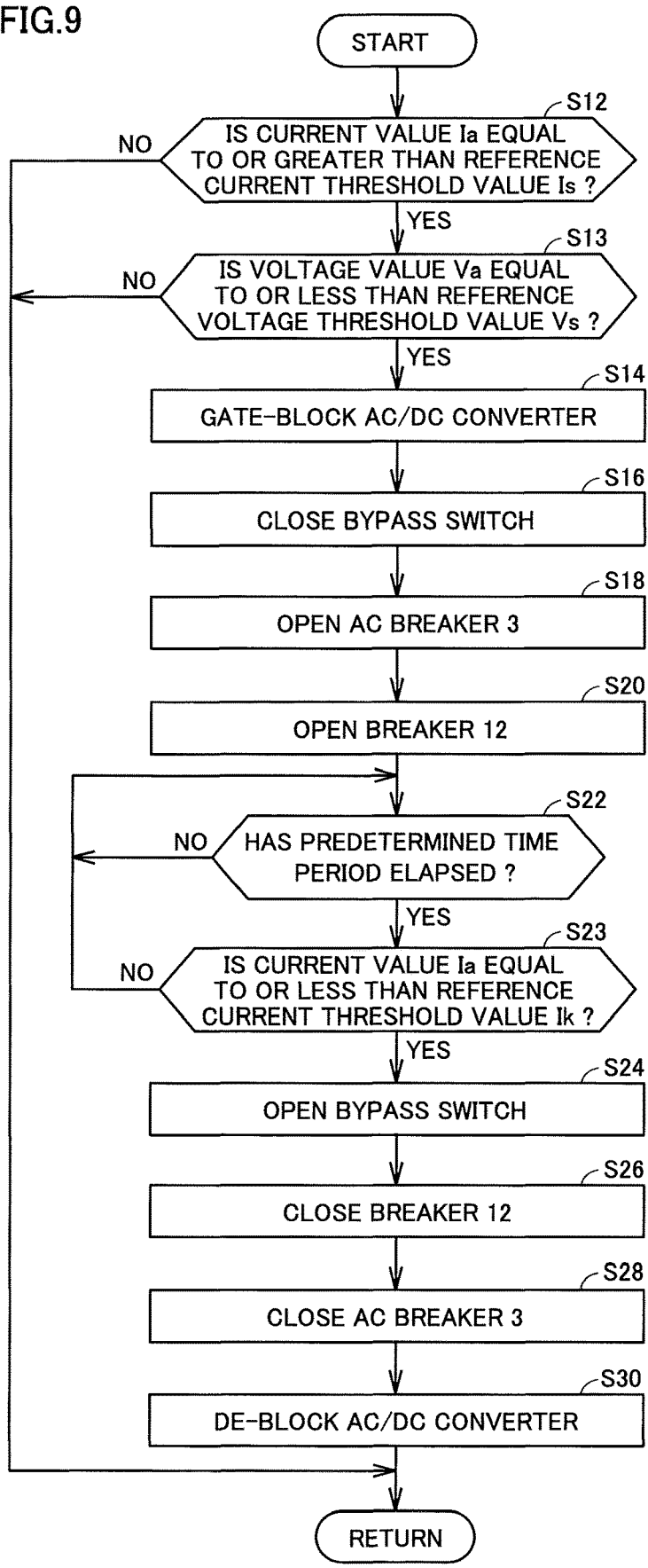
FIG. 9 is a flowchart illustrating the processing procedure for the controller.

FIG. 9 is a flowchart illustrating the processing procedure for controller 100. Typically, each of the following steps is implemented by a CPU in controller 100 executing the program stored in a ROM. It is assumed that controller 100 constantly monitors the current value inputted from current detector 51 and the DC voltage value inputted from DC voltage detector 52.

Referring to FIG. 9, controller 100 determines whether or not current value Ia is equal to or greater than reference current threshold value Is (step S12). When current value Ia is less than reference current threshold value Is (NO in step S12), controller 100 ends the process. On the other hand, when current value Ia is equal to or greater than reference current threshold value Is (YES in step S12), controller 100 determines whether or not DC voltage value Va is equal to or less than reference voltage threshold value Vs (step S13). When DC voltage value Va is greater than reference voltage threshold value Vs (NO in step S13), controller 100 ends the process. When DC voltage value Va is equal to or less than reference voltage threshold value Vs (YES in step S13), controller 100 gate-blocks AC/DC converter 20 (turns off switching elements Q1 and Q2 in each of cells L1 to L12) (step S14), and then closes each bypass switch SW (step S16). By the processes in step S14 and step S16, breakage of each element in each of cells L1 to L12 caused by a fault current can be prevented.

Then, controller 100 transmits a trip signal to AC breaker 3 to open AC breaker 3 (step S18), and transmits a trip signal to breaker 12 to open breaker 12 (step S20). By the processes in step S18 and step S20, a current does not completely flow through AC/DC converter 20, so that preparation for restart is completed. Generally, since breaker 12 is mounted in a DC circuit, it is preferable that the current flowing through breaker 12 is suppressed. Accordingly, after controller 100 opens AC breaker 3 to thereby break an inflow of the current from AC system 2, this controller 100 opens breaker 12. Breaker 12 has a function equivalent to a Metallic Return Transfer Breaker (MRTB).

Controller 100 determines whether a predetermined time period has elapsed or not since breaker 12 was opened (step S22). When the predetermined time period has not elapsed (NO in step S22), controller 100 repeats the process in step S22. When the predetermined time period has elapsed (YES in step S22), controller 100 determines whether or not current value Ia is equal to or less than reference current threshold value Ik (step S23). When current value Ia is greater than reference current threshold value Ik (NO in step S23), controller 100 repeats the processes from step S22. When current value Ia is equal to or less than reference current threshold value Ik (YES in step S23), controller 100 opens each bypass switch SW (step S24). Controller 100 closes breaker 12 (step S26), and subsequently closes AC breaker 3 (step S28).

Breaker 12 is first closed and AC breaker 3 is subsequently closed. This is for the purpose of suppressing the impact of the voltage difference upon AC/DC converter 20 or a DC circuit. Specifically, when AC breaker 3 is closed before breaker 12 is closed, a capacitor inside AC/DC converter 20 is started to be charged. Accordingly, in this case, a DC circuit is to be configured in the state where the capacitor is charged, in which the impact of the voltage difference upon AC/DC converter 20 and the DC circuit is larger as compared with the case where a DC circuit is configured before the capacitor is charged. Therefore, in order to suppress the impact of the voltage difference, controller 100 closes breaker 12 and subsequently closes AC breaker 3. Then, controller 100 de-blocks AC/DC converter 20 (step S30) and ends the process.

As described above, time period T1 until the time when bypass switch SW is closed is shorter than time period T2 until the time when breaker 12 (or AC breaker 3) is opened. Also, time period T3 until the time when the switching element is turned off is overwhelmingly shorter than time period T1 and time period T2. Accordingly, controller 100 may simultaneously execute a command of gate-blocking (step S14), a command of closing each bypass switch SW (step S16), and a command of opening AC breaker 3 (step S18). Also in this case, after the switching element is turned off and each bypass switch SW is closed, then AC breaker 3 is opened.

<Modifications>

In the above description, an explanation has been given with regard to the configuration in which controller 100 in power conversion device 5 controls AC/DC converter 20, AC breaker 3 and breaker 12. In a modification, an explanation will be given with regard to the configuration in which the controller in the power conversion device controls AC/DC converter 20, and the protection control device controls AC breaker 3 and breaker 12.

Figure 10:
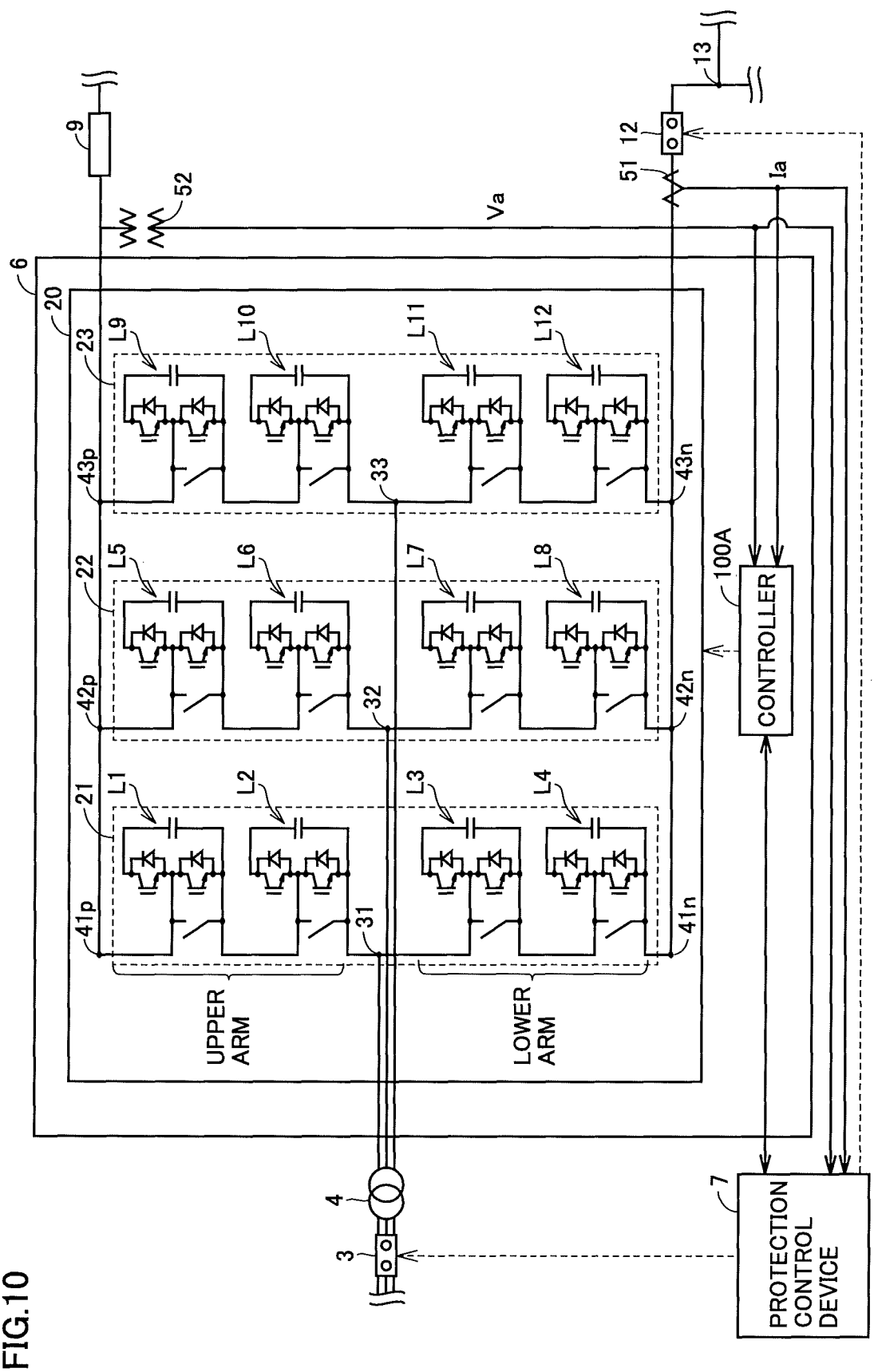
FIG. 10 is a diagram for illustrating the configuration of a power conversion device and a protection control device according to a modification.

FIG. 10 is a diagram for illustrating the configuration of a power conversion device 6 and a protection control device 7 according to a modification. The configuration of power conversion device 6 is the same as the configuration of power conversion device 5 except that controller 100 in power conversion device 5 is replaced with a controller 100A. The same portions in the configuration of power conversion device 6 as those in the configuration of power conversion device 5 will not be specifically described.

Controller 100A includes a communication interface for communicating with protection control device 7, so that controller 100A can exchange various types of information with protection control device 7 through this communication interface.

Based on the information received from protection control device 7, current value Ia inputted from current detector 51 and DC voltage value Va inputted from DC voltage detector 52, controller 100A makes a determination about a fault on main line 9, and controls the operation of AC/DC converter 20 to be stopped and resumed. Specific details about the process of controller 100A will be described later.

Based on the information received from controller 100A, current value Ia inputted from current detector 51 and DC voltage value Va inputted from DC voltage detector 52, protection control device 7 controls AC breaker 3 to be opened and closed, and controls breaker 12 to be opened and closed. Specific details about the process of protection control device 7 will be described later.

Figure 11:
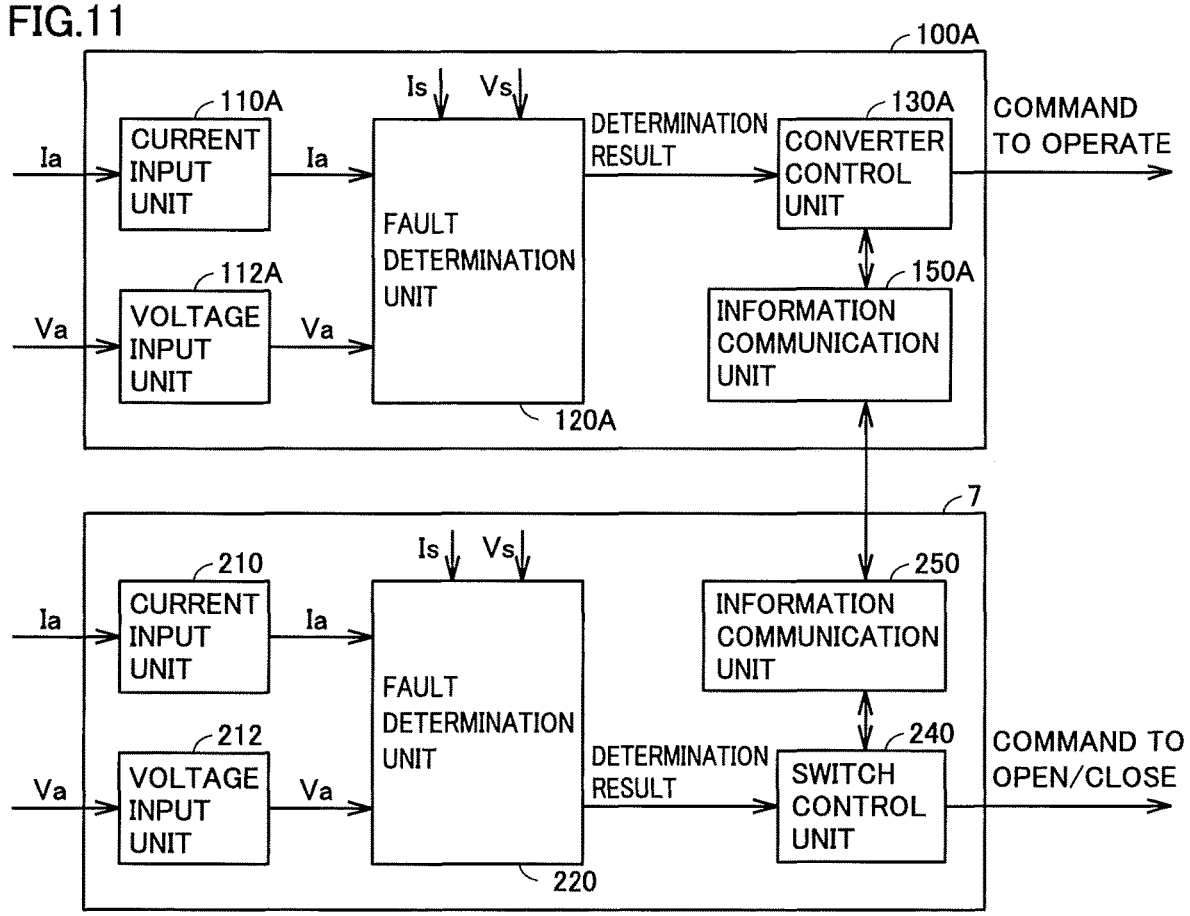
FIG. 11 is a functional block diagram of a controller in the power conversion device and the protection control device.

FIG. 11 is a functional block diagram of a controller 100A in power conversion device 6 and protection control device 7. Referring to FIG. 11, controller 100A includes a current input unit 110A, a voltage input unit 112A, a fault determination unit 120A, a converter control unit 130A, and an information communication unit 150A. Protection control device 7 includes a current input unit 210, a voltage input unit 212, a fault determination unit 220, a switch control unit 240, and an information communication unit 250.

Current input unit 110A, voltage input unit 112A and fault determination unit 120A in controller 100A are the same as current input unit 110, voltage input unit 112 and fault determination unit 120, respectively, in FIG. 8. Converter control unit 130A controls the operation of AC/DC converter 20. From protection control device 7, information communication unit 150A receives the opening/closing information showing the state where AC breaker 3 is opened or closed, and the opening/closing information showing the state where breaker 12 is opened or closed.

Specifically, when current value Ia is equal to or greater than reference current threshold value Is (and when DC voltage value Va is equal to or less than reference voltage threshold value Vs), converter control unit 130A stops each of cells L1 to L12, and subsequently closes bypass switch SW. After a predetermined time period has elapsed since information communication unit 150A received the information showing that breaker 12 (and AC breaker 3) is opened (opening information), converter control unit 130A opens each bypass switch SW. It is to be noted that converter control unit 130A may open each bypass switch SW after it confirms that no current flows through AC/DC converter 20. Also, when information communication unit 150A receives the information showing that breaker 12 (and AC breaker 3) is closed (closing information), converter control unit 130A causes each of cells L1 to L12 to operate.

Furthermore, information communication unit 150A may transmit the opening/closing information about bypass switch SW to protection control device 7. Also, information communication unit 150A may transmit, to protection control device 7, the switching state information showing the state where AC/DC converter 20 is gate-blocked (the state where switching elements Q1 and Q2 in each of cells L1 to L12 are turned off) and the state where AC/DC converter 20 is de-blocked (the state where switching elements Q1 and Q2 in each of cells L1 to L12 cannot be turned on).

Current input unit 210 in protection control device 7 receives an input of current value Ia from current detector 51. Voltage input unit 212 receives an input of DC voltage value Va from DC voltage detector 52. Based on current value Ia and reference current threshold value Is (and DC voltage value Va and reference voltage threshold value Vs), fault determination unit 220 determines whether a fault has occurred or not on main line 9. Switch control unit 240 controls breaker 12 to be opened and closed, and controls AC breaker 3 to be opened and closed. Information communication unit 250 receives the opening/closing information about bypass switch SW (and the switching state information) from controller 100A.

Specifically, when it is determined by fault determination unit 220 that a fault has occurred, switch control unit 240 opens AC breaker 3 and subsequently opens breaker 12 for clearing the fault. Furthermore, when information communication unit 250 receives the information showing that bypass switch SW is opened, switch control unit 240 closes breaker 12 and subsequently closes AC breaker 3 for recovering from the fault.

Figure 12:
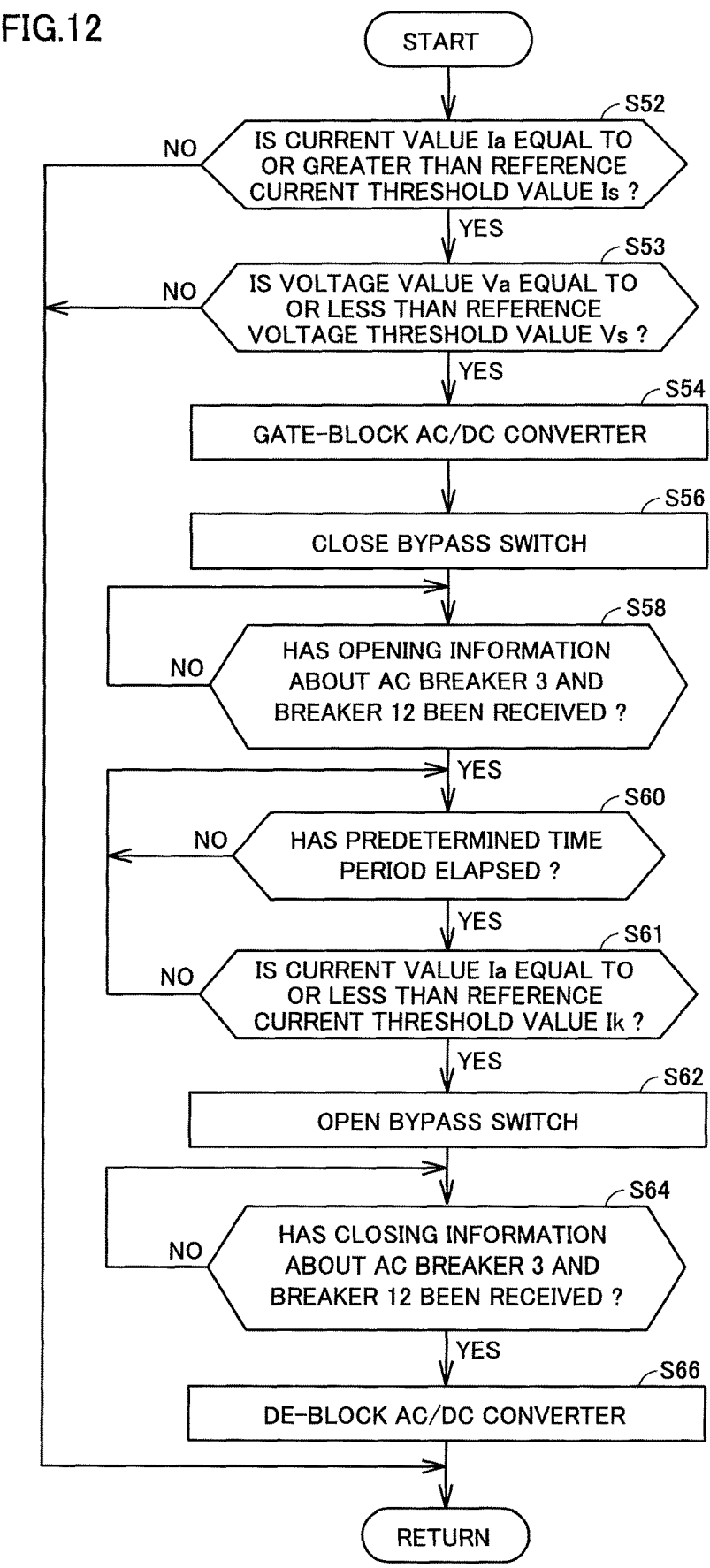
FIG. 12 is a flowchart illustrating the processing procedure for the controller.

FIG. 12 is a flowchart illustrating the processing procedure for a controller 100A. Typically, each of the following steps is implemented by a CPU in controller 100A executing the program stored in a ROM. It is assumed that controller 100A constantly monitors a current value Ia inputted from current detector 51 and a DC voltage value Va inputted from DC voltage detector 52.

Referring to FIG. 12, since the processes in step S52 to step S56 are the same as the processes in steps S12 to S16 in FIG. 9, the detailed description thereof will not be repeated.

Controller 100A determines whether or not it has received the opening information showing that AC breaker 3 and breaker 12 are opened (step S58). When the opening information has not been received (NO in step S58), controller 100A repeats the process in step S58. When the opening information has been received (YES in step S58), controller 100A determines whether a predetermined time period has elapsed since it received the opening information (step S60). When a predetermined time period has not elapsed (NO in step S60), controller 100A repeats the process in step S60. When a predetermined time period has elapsed (YES in step S60), controller 100 determines whether or not a current value Ia is equal to or less than reference current threshold value Ik (step S61). When current value Ia is greater than reference current threshold value Ik (No in step S61), controller 100 repeats the processes from step S60. When current value Ia is equal to or less than reference current threshold value Ik (YES in step S61), controller 100A opens each bypass switch SW (step S62).

Controller 100A determines whether it has received the closing information showing that AC breaker 3 and breaker 12 are closed (step S64). When the closing information has not been received (NO in step S64), controller 100A repeats the process in step S64. When the closing information has been received (YES in step S64), controller 100A de-blocks AC/DC converter 20 (step S66), and ends the process.

<Application Example in DC Power Transmission System Having Tripolar Configuration>

In the above description, an explanation has been given with regard to the configuration in which a power conversion device is applied to a bipolar DC power transmission system, but this configuration does not necessarily have to be applied. For example, power conversion device 5 is applicable also to a DC power transmission system having a tripolar configuration as shown in FIG. 13.

Figure 13:
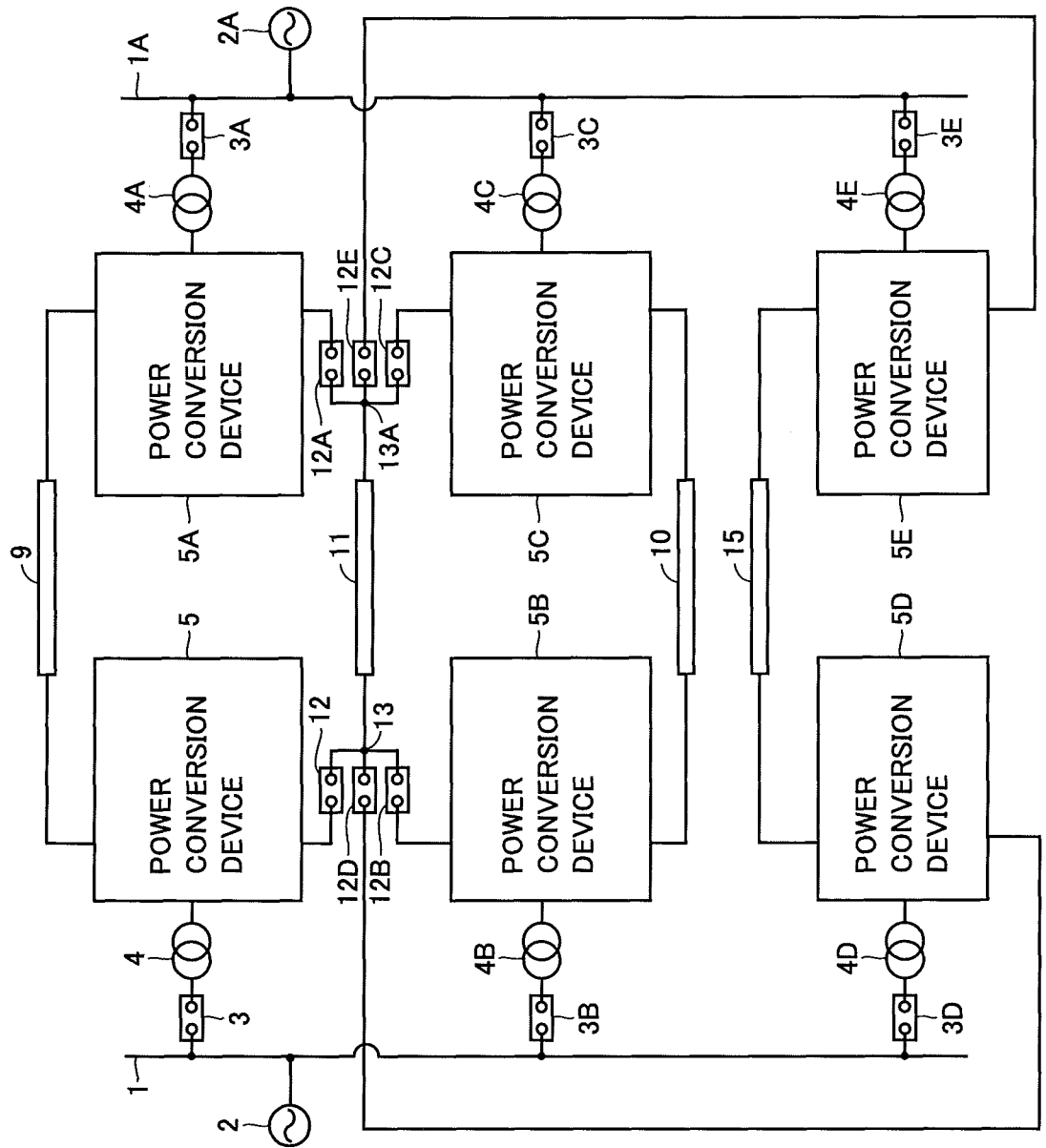
FIG. 13 is a diagram showing an example of a DC power transmission system having a tripolar configuration to which the power conversion device is applied.

FIG. 13 is a diagram showing an example of a DC power transmission system having a tripolar configuration to which a power conversion device is applied. Referring to FIG. 13, the DC power transmission system is formed as a DC power transmission system having a tripolar configuration (a tripolar DC power transmission system), which is formed of main lines 9, 10 and 15 of three poles and neutral line 11.

Specifically, the first pole is formed of power conversion devices 5 and 5A, main line 9, and neutral line 11. The second pole is formed of power conversion devices 5B and 5C, main line 10, and neutral line 11. The third pole is formed of power conversion devices 5D and 5E, main line 15, and neutral line 11. It is to be noted that the first pole, the second pole and the third pole share neutral line 11.

Power conversion devices 5D and 5E are connected to main line 15, and also connected to neutral line 11 through breakers 12D and 12E, respectively. Furthermore, power conversion devices 5D and 5E are respectively connected to AC buses 1 and 1A through transformers 4D and 4E, and through AC breaker 3D and 3E.

One pole of the first pole to the third pole is utilized as a preliminary pole. For example, it is assumed that a ground fault occurs on main line 9 in the first pole when DC power transmission is performed in the first pole and the second pole. In this case, during the time period until the time when the first pole recovers from the fault, the third pole is used in place of the first pole, so that DC power transmission can be performed in the bipolar DC power transmission system formed of the second pole and the third pole.

In addition, when DC power transmission is performed in the first pole and the second pole, AC breakers 3D, 3E and breakers 12D, 12E each are opened. Also, when the third pole is used, AC breakers 3D, 3E and breakers 12D, 12E each are closed. Specifically, when a fault occurs in the first pole and this first pole is separated from the second pole (AC breakers 3, 3A and breakers 12, 12A are opened), power conversion devices 5D and 5E receive the information showing that the first pole is separated from the second pole. Then, power conversion devices 5D and 5E close AC breakers 3D and 3E, respectively, and close breakers 12D and 12E, respectively, so as to operate the AC/DC converter.

By applying a power conversion device to the DC power transmission system having a tripolar configuration as described above, even if a fault occurs in one of three poles, DC power transmission can be performed by a bipolar DC power transmission system that uses two sound poles.

Although an explanation has been herein given with regard to the configuration to which power conversion device 5 is applied, power conversion device 6 and protection control device 7 described in the modification may be applied.

<Other Embodiments>

In the above-described embodiment, an explanation has been given with reference to FIG. 1 and the like about the configuration in which neutral points 13 and 13A are connected through one neutral line 11 such that the first pole and the second pole share neutral line 11, but a neutral line may be used for each pole (that is, two neutral lines are used). Also, the configuration using a ground return scheme may be applied, in which each of neutral points 13 and 13A is grounded so as to use the ground as a return wire without connecting neutral points 13 and 13A through neutral line 11.

In the above-described embodiment, an explanation has been given with reference to FIG. 2 about the configuration in which current detector 51 is provided between DC terminals 41n to 43n and breaker 12, but this configuration does not necessarily have to be applied. For example, current detector 51 may be provided in each phase. In this case, three current detectors 51 are provided such that each current detector 51 is located between cell L4 and DC terminal 41n, between cell L8 and DC terminal 42n, and between cell L12 and DC terminal 43n. Furthermore, breaker 12 may also be similarly provided in each phase.

Furthermore, current detector 51 may be configured so as to be provided between main line 9 and DC terminals 41p to 43p on the main line 9 side. In this case, controller 100 (current input unit 110) receives an input of the current value of the direct current flowing between main line 9 and DC terminals 41p to 43p on the main line 9 side.

In the above-described embodiment, power conversion devices 5 and 5A in the first pole may be configured to be capable of transmitting and receiving the information to and from each other through a higher-level device (such as a pole control device) for controlling the operation of the first pole. For example, the pole control device is configured to receive the opening/closing information about the breaker and the AC breaker from one power conversion device, and transmit this opening/closing information to the other power conversion device. Furthermore, the higher-level device may be a bipolar control device configured to control the operations of the first pole and the second pole.

In the above-described embodiment, an AC current detector may be provided between transformer 4 and AC/DC converter 20. The AC current detector detects an AC current flowing between transformer 4 and AC/DC converter 20, and inputs the current value of this AC current into controller 100. Typically, when the current value is equal to or greater than a predetermined AC threshold value, controller 100 interrupts AC breaker 3.

In the above-described embodiment, an explanation has been given with regard to the configuration in which AC/DC converter 20 has three phase modules as shown in FIG. 2, but this configuration does not necessarily have to be applied. AC/DC converter 20 only has to include at least one phase module.

In the above-described embodiment, an explanation has been given with regard to the configuration in which bypass switch SW is provided in each of the plurality of cells L so as to entirely bypass (short-circuit) the plurality of cell L as shown in FIG. 2, but this configuration does not necessarily have to be applied. At least one bypass switch SW may be provided (connected) for a plurality of cells L. For example, one bypass switch SW may be provided for a plurality of cells L (cells L1, L2 and the like) corresponding to an upper arm so as to bypass the entire upper arm. Furthermore, one bypass switch SW may be provided for a plurality of cells L (cells L3, LA and the like) corresponding to a lower arm so as to bypass the entire lower arm. Furthermore, for example, when there are five cells L corresponding to an upper arm, bypass switch SW for short-circuiting three cells L and bypass switch SW for short-circuiting two cells L may be provided. In other words, the number of bypass switches SW is not limited as long as a plurality of cells L can be entirely bypassed.

In the above-described embodiment, each of AC terminals 31 to 33 may be configured as a secondary winding in a corresponding one of phases. Specifically, AC/DC converter 20 may be configured to receive the AC power outputted from the primary winding in each phase, which serves as an AC terminal of transformer 4, through the secondary windings in phases, which serve as AC terminals 31 to 33.

The configuration illustrated as an embodiment described above, which is merely an example of the configuration of the present invention, can be combined with another known technique or can also be configured by modification such as partial omission within a scope not deviating from the feature of the present invention.

Also in the above-described embodiment, the processes and the configurations described in other embodiments may be employed as appropriate for implementation.

<Advantages>

According to the above-described embodiments, a fault current is prevented from flowing from a sound pole in which no fault occurs into a fault pole in which a fault occurs, so that the fault can be immediately cleared. Furthermore, the time period during which a fault current flows through an AC/DC converter is reduced, so that an adverse influence upon the AC/DC converter can be minimized. Furthermore, it becomes possible to not only prevent a fault inside the AC/DC converter, but also prevent an inflow of the fault current caused due to a fault on the main line.

According to the above-described embodiments, since a fault pole is separated from a sound pole, DC power transmission can be performed only in a sound pole. Furthermore, by preventing an inflow of the fault current from a sound pole into a fault pole, bypass switch SW inside the AC/DC converter in the fault pole can be opened. Accordingly, the AC/DC converter in the fault pole can be immediately restarted.

According to the above-described embodiments, by appropriately controlling the operation of the AC/DC converter to be started and stopped, and by appropriately opening and closing the breaker, an AC/DC converter can also be protected while speedily clearing a fault. Thus, for example, cost reduction can be achieved in the entire system without having to use an expensive breaker with high responsiveness.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1, 1A AC bus, 2, 2A AC system, 3 to 3E AC breaker, 4 to 4E transformer, 5 to 5E, 6 power conversion device, 7 protection control device, 9, 10, 15 main line, 11 neutral line, 12 to 12E breaker, 13, 13A neutral point, 20 AC/DC converter, 21 to 23 phase module, 31 to 33 AC terminal, 41p to 43p, 41n to 43n DC terminal, 51 current detector, 52 DC voltage detector, 100, 100A controller, 110, 110A, 210 current input unit, 112, 112A, 212 voltage input unit, 120, 120A, 220 fault determination unit, 130, 130A converter control unit, 140, 240 switch control unit, 150A, 250 information communication unit, C capacitor, D1, D2 diode, E1, E2 cell terminal, L cell, Q1, Q2 switching element, SW bypass switch.

The invention claimed is:

1. A power transmission system comprising:
 a power conversion device including
  a first arm and a second arm each including a plurality of cells, each of the plurality of cells including a switching element and a capacitor, and
  at least one bypass switch provided for one or more of the plurality of cells, the at least one bypass switch being configured to be closed so as to allow passage of a fault current; and
 a switch configured to
  be opened so as to prevent an inflow of a current from a sound pole into the at least one bypass switch after the at least one bypass switch is closed, and
  be closed after the at least one bypass switch is opened.

2. The power transmission system according to claim 1, wherein
 a first pole having a first main line and a second pole having a second main line share a neutral line, and
 the power conversion device and the switch are provided in the first pole.

3. The power transmission system according to claim 2, wherein
 the first arm is provided between a DC terminal on a side of the first main line and an AC terminal, and
 the second arm is provided between a DC terminal on a side of the neutral line and the AC terminal.

4. The power transmission system according to claim 1, comprising a second switch provided between an AC system and the power conversion device, the second switch being configured to be closed after a first switch as the switch is closed.

5. The power transmission system according to claim 1, wherein the fault current is a current flowing due to a fault in the power conversion device.

6. The power transmission system according to claim 1, wherein the switch is a breaker.

7. A power conversion device comprising:
 a first arm and a second arm each including a plurality of cells, each of the plurality of cells including a switching element and a capacitor; and
 at least one bypass switch provided for one or more of the plurality of cells, the at least one bypass switch being configured to be closed so as to allow passage of a fault current,
 the at least one bypass switch being configured to, when the fault current occurs,
  be closed before a switch is opened to separate the at least one bypass switch and a sound pole from each other, and
  be opened before the switch is closed.

8. A switch used in a power transmission system including a power conversion device, the power conversion device comprising:
 a first arm and a second arm each including a plurality of cells, each of the plurality of cells including a switching element and a capacitor; and
 at least one bypass switch provided for one or more of the plurality of cells, the at least one bypass switch being configured to be closed so as to allow passage of a fault current,
 the switch being configured to
  be opened to separate the at least one bypass switch and a sound pole from each other after the at least one bypass switch is closed, and
  be closed after the at least one bypass switch is opened.

9. A method of controlling a power transmission system including a power conversion device and a switch,
 the power conversion device including
  a first arm and a second arm each including a plurality of cells, each of the plurality of cells including a switching element and a capacitor, and at least one bypass switch provided for one or more of the plurality of cells, the method comprising:

closing the at least one bypass switch so as to allow passage of a fault current;

opening the switch so as to prevent an inflow of a current from a sound pole into the at least one bypass switch after the at least one bypass switch is closed; and closing the switch after the at least one bypass switch is opened.

* * * * *